United States Patent
Huizer et al.

(10) Patent No.: US 6,751,802 B1
(45) Date of Patent: Jun. 15, 2004

(54) METHOD OF TRANSMITTING AND RECEIVING COMPRESSED TELEVISION SIGNALS

(75) Inventors: Cornelis M. Huizer, Eindhoven (NL); Lucas M. W. M. Karel, Eindhoven (NL); Frank Bosveld, Eindhoven (NL); Pieter Jan De Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 908 days.

(21) Appl. No.: 08/683,994

(22) Filed: Jul. 19, 1996

(30) Foreign Application Priority Data

Jul. 21, 1995 (EP) .............................................. 95202019

(51) Int. Cl.⁷ ............................................. H04N 7/173
(52) U.S. Cl. .............................. 725/90; 725/88; 725/91; 725/101; 725/102
(58) Field of Search ................................ 709/217, 218, 709/219; 348/7, 9, 10, 423, 461, 464, 465, 467, 845.1–845.3; 725/88, 90, 102, 87, 101, 91

(56) References Cited

U.S. PATENT DOCUMENTS

| | | | | |
|---|---|---|---|---|
| 5,357,276 A | * | 10/1994 | Banker et al. | 348/7 |
| 5,448,568 A | * | 9/1995 | Delpuch et al. | 372/94.2 |
| 5,477,263 A | * | 12/1995 | O'Callaghan et al. | 348/7 |
| 5,635,979 A | * | 6/1997 | Kostreski et al. | 348/13 |
| 5,659,539 A | * | 8/1997 | Porter et al. | 395/200.61 |
| 5,721,829 A | * | 2/1998 | Dunn et al. | 395/200.49 |
| 5,873,022 A | * | 2/1999 | Huizer et al. | 455/4.2 |

* cited by examiner

Primary Examiner—Vivek Srivastava
Assistant Examiner—Ngoc Vu

(57) ABSTRACT

The invention relates to the transmission of MPEG encoded television signals from a Video-On-Demand server (1) to a receiver (2) via a network (3). Non-linear playback functions such as 'pause' and 'resume' require a very accurate control of the bit stream, taking account of typical network aspects such as network latency and remultiplexing. In order to allow the receiver to flawlessly resume signal reproduction after a pause, position labels (p; 5,6; 7a,7b,8a,8b) are inserted into the bit stream at positions where the server can resume transmission of the signal after an interruption. Upon a pause request, the decoder initially continues the reproduction until such a position label is detected. The subsequent bits delivered by the network are ignored, i.e. they are thrown away. Upon a request to resume reproduction, the receiver requests the server to retransmit the signal starting at the detected position.

13 Claims, 3 Drawing Sheets

METHOD OF TRANSMITTING AND RECEIVING COMPRESSED TELEVISION SIGNALS

FIELD OF THE INVENTION

The invention relates to methods of transmitting and receiving compressed television signals. The invention also relates to arrangements for carrying out said methods, more particularly, arrangements such as video-on-demand servers for transmitting, and set top boxes for receiving, MPEG compressed audio and video signals.

BACKGROUND OF THE INVENTION

The so-called "Transport stream" and "Program Stream" as defined within the MPEG-2 standard provide a standardized mechanism for the transmission and storage of MPEG compressed audio and video (A/V) information. Both streams contain time stamps to synchronize the decoding and presentation of the conveyed audio and video information while ensuring that data buffers in the decoders do not overflow or underflow during linear playback. In addition, these time stamps are used for the correct delivery of the streams themselves. The MPEG Transport Stream is tailored to the communication or the storage of one or more programs of digital data in environments in which significant errors may occur. Such environments are for example terrestrial and satellite broadcast channels, cable channels, and other telecommunication networks. The MPEG Program Stream is tailored to communication or storage of one program of digital data in environments where errors are very unlikely, and where software processing of system coding is a major consideration. Such environments are, for example, PCs with optical and magnetic storage media.

In the last few years, significant effort has been devoted to applications that involve the linear playback and transmission of Program and Transport Streams. For example, broadcasting MPEG-2 encoded programs involves the distribution of Transport Streams of infinite length. However, the non-linear playback of MPEG Transport Streams and Program Streams from video servers has not received the same level of attention. Nonlinear playback involves the interruption and continuation of the stream and is necessary for basically all kinds of trick modes. Trick-modes require an accurate control of the stream. For local disc-based systems, solutions are known to support trick-modes such as pause, slow motion, and fast forward. However, the known solutions can not be applied to network environments, because networks differ from local systems in two aspects.

The first aspect is the delay decoder-network-server-network-decoder. This delay, which is further referred to as the network latency, is not constant and can have a magnitude of up to one second. A consequence of the network latency is that after the end-user requests a pause (resulting in a stall of the decoding and display process and sending a pause command to the server), the network will continue to deliver bits to the decoder for some period of time. The subsequent continuation of the stream is also complicated by the network latency. Namely, because of the network latency there is a significant delay between the transmission of the 'Resume' command to the server and the arrival of the requested bits at the decoder. The bits delivered after the pause command and the temporary lack of bits after the resume command have to be handled by the decoder in such a way that the decoder can flawlessly resume its decoding and display process.

The second aspect is the possible presence of MPEG-2 remultiplexers in the network. The presence of remultiplexers complicates the support for trick-modes because remultiplexers allow the packets having different PIDs in a Transport Stream to be reordered. A PID is a Packet IDentifier as defined in the MPEG-2 standard. In practice this means that the packets do not enter the decoder in the same order as they were sent by the server. Note that the presence of remultiplexers does not complicate the trick-mode support for Transport Streams with only one PID, e.g. video, because remultiplexers are not allowed to reorder the packets within one PID.

OBJECT AND SUMMARY OF THE INVENTION

It is an object of this invention to provide trick-mode support for MPEG-2 Transport Streams and Program Streams in network environments.

To that end, the invention provides a method of transmitting a compressed television signal, characterized by inserting position labels into said signal at positions where the transmission of said signal can be resumed after an interruption.

The invention is based on the strategy that a decoder throws away all bits that are delivered by the network after the 'Pause' command has been issued. For a successful continuation of the stream, the decoder has to know exactly what the position in the stream was (e.g. how many bits have been received from the server) when the pause was effected. This is necessary to instruct the server exactly at which point to continue in order to keep the MPEG-2 data consistent. Otherwise part of an MPEG frame would be duplicated or missing. Normally, the server cannot exactly determine the stream position at the time the pause was effected at the decoder due to the latency in the communication between decoder and server. By transmitting unique position labels in each of the PIDs of the Transport Stream, decoders can precisely determine which bits are stored and which are thrown away. The continuation of the stream involves the request for new bits starting at the appropriate position label.

The invention concentrates on two trick-modes, namely: 'pause/continue' and 'slow motion'. The required functionality for 'pause and continue' is that a user can pause the display at any point in time and can continue flawlessly afterward. Preferably, interruption takes effect immediately e.g. at the frame/field which is currently displayed and continuation should occur at the next frame without any missing or duplicated frames. 'Pause and continue' involves the transmission of 'Pause' and 'Resume' commands from the decoder to the server to stop and continue the stream. The required functionality for 'slow motion' is that a user can visualize the stream at a speed lower than the normal playback speed. The decoder should be able to switch between the slow motion mode and normal playback mode. The switch should take effect immediately without any missing or duplicated frames. 'Slow motion' also involves the transmission of 'Pause' and 'Resume' messages from the decoder to the server to stop and start the stream.

Several fields in the MPEG-2 standard can be used to convey the unique position labels. The position labels can be accommodated in a separate stream of intermediate control packets, for example, using the concept of MPEG stream descriptors. The PCR fields of each PID stream in the Transport Stream can be used when the PCR information is transmitted in a separate stream. PCR means Program Clock Reference as defined in the MPEG-2 standard. Accommodating the position labels in a separate stream of control packets works well if there are no remultiplexers in the network, i.e. if packets having different PIDs cannot be reordered.

The position labels can also be accommodated in the signal (audio, video, etc.) packets themselves, for example, in the private data part of adaptation fields of particular packets. This embodiment also works for networks comprising remultiplexers. For all cases, the repetition rate of the position labels should be high enough to allow for a fine control of the stream. The position labels of different PIDs that belong together can be identified by a particular time code.

The corresponding method of receiving a digital television signal is characterized by the steps of: sending a request to the transmitter to interrupt transmission of the signal; interrupting the reproduction of the signal upon detection of a position label accommodated in the received bit stream and throwing away the received signal following said position label; sending a request to the transmitter to resume transmission of the signal from the position defined by said position label; and resuming the reproduction of the signal upon receipt thereof.

The continuation of the stream involves a delay equal to the network latency. The delay can be circumvented by using a latency buffer whose size is equal to the maximum network latency times the bit rate of the stream. This approach works for both 'Pause and Continue' trick modes as well as for the 'Slow Motion' trick mode. With such a latency buffer, the decoder may pause the reproduction of the signal immediately and keep the bits up to a later received position label available in the buffer. Only the bits following said later received position label are now thrown away. Upon the resume command, the reproduction of the still available bits is resumed and the server is requested to resume transmission of the bits following the later received position label.

These and other aspects of the invention will be apparent from and elucidated with reference to the embodiments described hereinafter.

DESCRIPTION OF PREFERRED EMBODIMENTS

Figure 1:
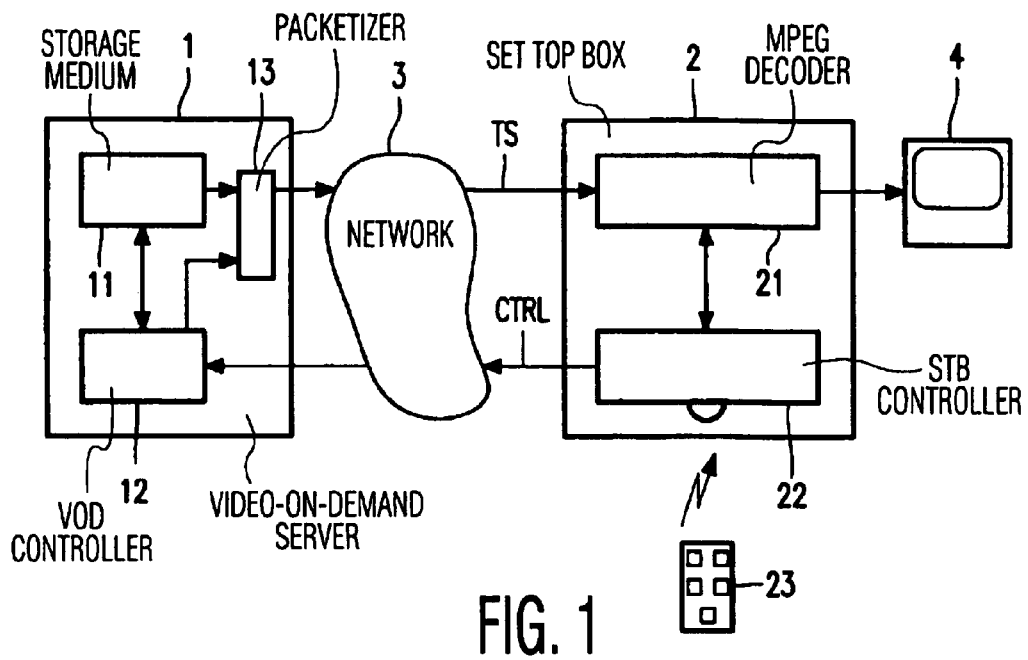
FIG. 1 shows a system comprising a Video-On-Demand server and a set top box in accordance with the invention.

FIG. 1 shows a system comprising a Video-On-Demand (VOD) server 1 and a set top box (STB) 2 connected via a network 3. The VOD-server comprises a storage medium 11 and a VOD-controller 12. The STB comprises an MPEG decoder 21, an STB-controller 22 and a (remote) control unit 23, and is connected to a reproduction device 4. User commands from remote control unit 23 are applied to STB-controller 22 and, as far as they require actions to be taken by the server, transmitted to the VOD-controller 12 via the network 3 as a control signal CTRL. A selected television program is transmitted from the server 1 to STB 2 in the form of an MPEG Transport Stream TS.

A plurality of television programs is stored on storage medium 11 which is usually an array of hard disks. From the STB point of view, the server behaves as a remote video recorder. The stored television programs can be played back at various speeds, paused and resumed. More particularly, the server can be instructed to playback the program starting at a given "tape" position. The operational command therefor will hereinafter be referred to as "Resume(p)" in which p identifies the position at which transmission of the signal can be resumed. The number of positions where playback of the program can be resumed is restricted, depending on how the signal is physically stored. For example, the positions have to correspond with disk sector or disk cylinder boundaries. Because the signal is compressed, i.e. the amount of disk space varies from picture to picture, resume positions are irregularly distributed over playback time. They may be several seconds apart.

The resume positions are known to the VOD-controller 12. As is shown in FIG. 1, the server 1 further comprises a packetizer circuit 13. This circuit receives an MPEG-compressed television signal from storage medium 11 and generates a stream of transport packets of fixed length. The packetizer also receives the resume positions p from VOD-controller 12 and inserts them in the transport stream in a manner which will be described later. The positions p can be expressed in various ways. For example, p may be an ordinary integer number. In the present example, p will be assumed to be a time code corresponding with the normal playback time.

Generally, television programs comprise a video signal, several audio signals and additional data for, inter alia, subtitles in various languages. For simplicity, it will be assumed here that the television program which is transmitted from the server to the STB comprises one audio signal A and one video signal V only. Accordingly, the transport stream comprises audio packets and video packets. Each packet comprises a header and a payload. The header comprises a Packet IDentifier (PID) which identifies whether the packet carries audio data or video data. Note that the Transport Stream TS may comprise various television programs. A Program Map Table is transmitted to indicate which PIDs constitute the relevant program. In the present example, the Transport Stream TS conveys the selected television program only.

Figure 2:
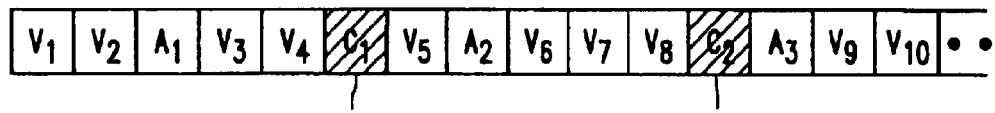
FIG. 2 shows an example of a television signal transmitted in accordance with one embodiment of the invention.

FIG. 2 shows an example of the Transport Stream TS which is transmitted by the server to the STB in accordance with an embodiment of the invention. The Transport Stream includes audio packets $A_1, A_2, A_3$, etc. and video packets $V_1$, $V_2$, $V_3$, etc. At the resume positions defined above, the Transport Stream includes position labels in the form of control packets C(p), two of which are shown by reference numerals 5 and 6. The PID of said control packets is associated with the relevant television program by means of the Program Map Table described above (control packets associated with a different television program have a different PID). In the payload of the packets, the relevant resume position p is encoded in the form of a time code. It should be noted that FIG. 2 is not drawn to scale. In practice, more audio and video packets are transmitted between two successive position labels than are shown in the Figure.

Figure 3:
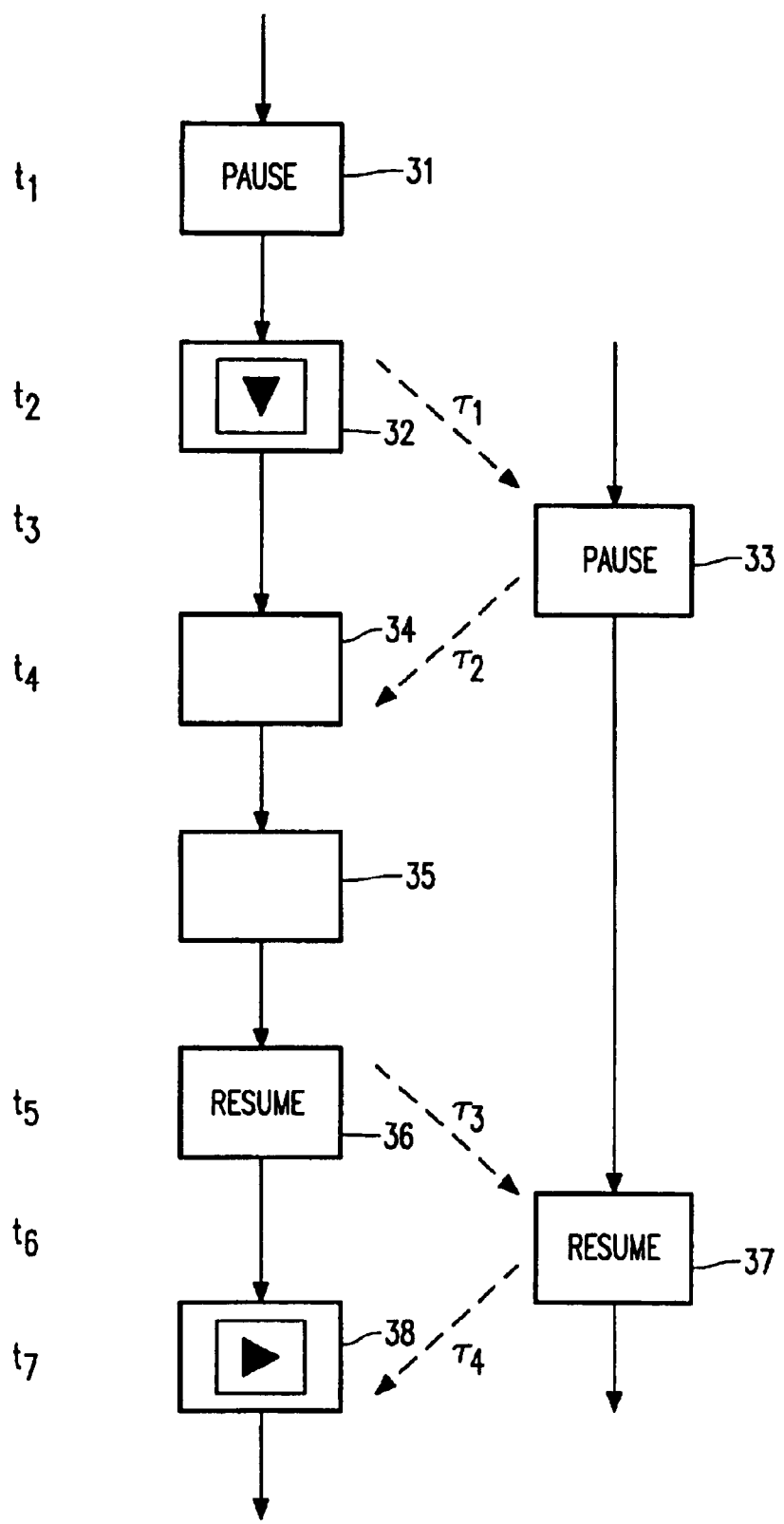
FIG. 3 shows a flowchart of operation steps carried out by the server and the set top box.

The operation of the server and the STB will now be explained collectively with reference to FIG. 3, which shows a flowchart of operation steps carried out by the STB (left side of the Figure) and the server (right side of the Figure). In a step 31 at t=$t_1$, the STB receives a pause command. However, the STB continues to decode and reproduce the received signal until a position label p is detected. Then, the reproduction of the signal is stalled in a step 32, at t=$t_2$, i.e. the video display is frozen and the audio reproduction is stopped.

In the step 32 the STB also forwards the pause command to the server. Transmitting the pause command to the server upon detection of the position label instead of immediately transmitting it guarantees that there is at least one position label present in the received signal. The pause command is received by the server in a step 33, at t=$t_3$, with a delay $\tau_1$, due to the latency of the network. In response to the pause command, the server instantaneously interrupts the transmission of the signal.

Step 34 denotes the interruption of the signal reception at the receiver end, at t=$t_4$, due to the latency $\tau_2$, of the network. In a step 35, the STB throws away all the received signal data following the position label that has been detected in the step 32.

In a step 36, at t=$t_5$, the STB receives a command from the user to resume the reproduction and transmits a "Resume (p)" command to the server in which p denotes the position where the reproduction was stalled. The resume command is received by the server in a step 37, at t=$t_6$, with a delay $\tau_3$ due to the latency of the network. In response to the resume command, the server resumes signal transmission starting at the position defined by p. With a delay $\tau_4$, the signal arrives at the STB which resumes the reproduction in a step 38, at t=$t_7$. It should be noted that the delays $\tau_1$–$\tau_4$ are not necessarily equal. They neither need to be constant over time.

Figure 4:
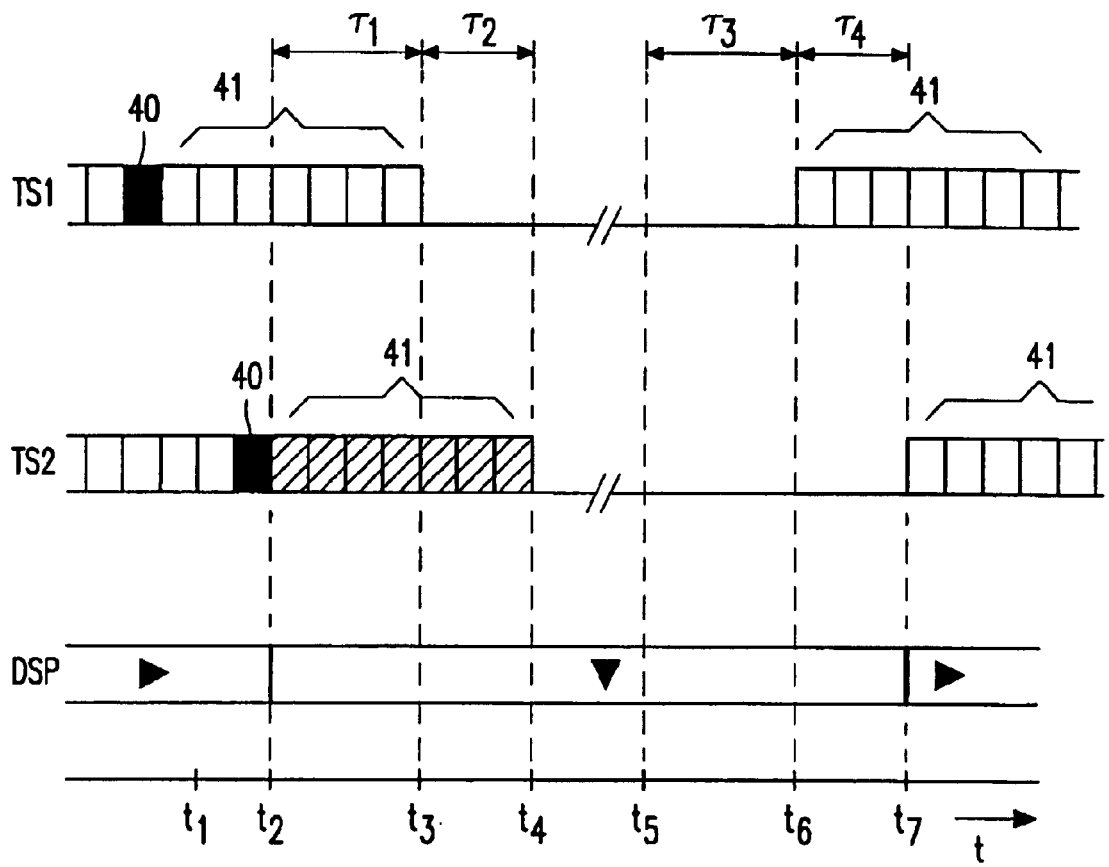
FIG. 4 shows a timing diagram illustrating the operation of the server and the set top box.

FIG. 4 shows a timing diagram of signals at various points in the system. More particularly, TS1 denotes the Transport Stream as transmitted by the server, TS2 denotes the Transport Stream as received by the STB, and DSP denotes the reproduced signal. At t=$t_1$, the pause command is received. At t=$t_2$, a position label 40 is detected. In response thereto, the reproduction is stalled and the packets 41 delivered by the network after the label are thrown away. At t=$t_3$, the server receives the pause command and interrupts the signal transmission which becomes manifest at the receiver end at t=$t_4$. At t=$t_5$, the STB receives the resume command. At t=$t_6$, the signal transmission is resumed starting with the packets 41 and, at t=$t_7$, the reproduction is continued flawlessly.

Figure 5:
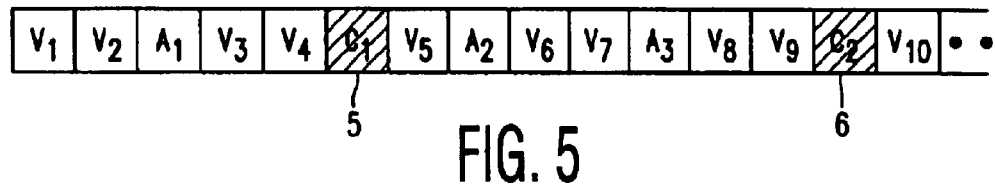
FIG. 5 shows an example of how the television signal shown in FIG. 2 may be received by the set top box.

The MPEG systems specification allows the order of packets having different PIDs in a Transport Stream to be changed. This will be the case if the network between server and STB comprises remultiplexers. For example, the Transport Stream shown in FIG. 2 may be received by the STB as a Transport Stream shown in FIG. 5. The transmitted packet sequence $V_8$-$C_2$-$A_3$-$V_9$ is now received as $A_3$-$V_8$-$V_9$-$C_2$ which is still a valid MPEG sequence. In accordance with the strategy described above, the STB will now stall the reproduction after decoding $A_3$, $V_9$ rather than $A_2$, $V_8$. However, the server will retransmit these packets after an interruption. Needless to say that the STB cannot flawlessly resume the reproduction of the signal.

A further embodiment of the invention will now be described in which the remultiplexing aspect is taken into account. In this embodiment, the VOD-controller 12 (FIG. 1) is adapted to accommodate the position labels in the audio and video packets themselves rather than inserting them in intermediate control packets which have a different PID. Preferably, the position labels are accommodated in the adaptation field which the MPEG standard provides. An adaptation field is an optional data field following the header of a transport packet. Two bits in the header indicate whether or not an adaptation field is present and whether or not the adaptation field is followed by payload. The MPEG standard allows private data bytes to be accommodated in the adaptation field. Preferably, these private data bytes carry the position label information.

Figure 6:
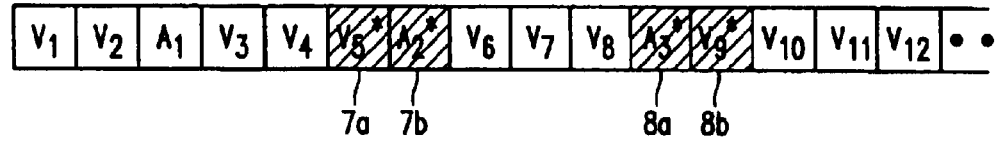
FIG. 6 shows an example of a television signal transmitted in accordance with a further embodiment of the invention.
Figure 7:
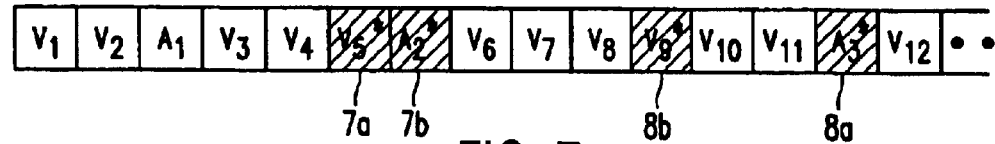
FIG. 7 shows an example of how the television signal shown in FIG. 6 may be received by the set top box.

FIG. 6 shows an example of the Transport Stream TS which is transmitted by the server in accordance with this embodiment. In this example, position labels are accommodated in audio packets 7a and 8a. The same position labels are accommodated in video packets 7b and 8b, respectively. FIG. 7 shows how this Transport Stream may be received by the STB due to remultiplexing.

The operation of the STB is essentially the same as described before. After a pause command, the STB continues to reproduce the video signal until a packet (for example, video packet $V_5$ denoted 7a) comprising a position label p is detected, and continues to reproduce the audio signal until an audio packet comprising the same position label p (in this case packet $A_2$ denoted 7b) is detected. Thus, irrespective of whether the STB receives the original Transport Stream shown in FIG. 6 or the remultiplexed Transport Stream shown in FIG. 7, video reproduction is interrupted after decoding $V_4$ and audio reproduction is interrupted after decoding $A_1$. Upon resumption of the operation, the STB will send the "Resume(p)" command to the server. In response thereto, the server will restart transmission of the signal with $A_2$ and $V_5$ and the decoder will flawlessly resume the reproduction of both signals.

In summary, the invention relates to the transmission of MPEG encoded television signals from a Video-On-Demand server (1) to a receiver (2) via a network (3). Non-linear playback functions such as 'pause' and 'resume' require a very accurate control of the bit stream, taking account of typical network aspects such as network latency and remultiplexing. In order to allow the receiver to flawlessly resume signal reproduction after a pause, position labels (p; 5,6; 7a,7b,8a,8b) are inserted into the bit stream at positions where the server can resume transmission of the signal after an interruption. Upon a pause request, the decoder initially continues the reproduction until such a position label is detected. The subsequent bits delivered by the network are ignored, i.e. they are thrown away. Upon a request to resume reproduction, the receiver requests the server to retransmit the signal starting at the detected position.

What is claimed is:

1. A method of transmitting a compressed television signal, comprising the steps of inserting position labels into said signal at positions where the transmission of said signal can be resumed after an interruption, wherein reproduction of said signal is interrupted upon detection of a position label after a pause command is received.

2. The method as claimed in claim 1, in which the signal is transmitted as a series of packets, wherein the position labels are accommodated in intermediate control packets.

3. The method as claimed in claim 2, wherein the position labels are transmitted as MPEG stream descriptors in said control transport packets.

4. The method as claimed in claim 1, in which the signal is transmitted as a series of packets, wherein the position labels are accommodated in said packets.

5. The method as claimed in claim 4, in which the position labels are transmitted as private data bytes in the adaptation field of MPEG transport packets.

6. A method of receiving a compressed television signal from a transmitter, comprising the steps of:

receiving a pause command;

sending a request to the transmitter to interrupt transmission of the signal;

interrupting reproduction of the signal upon detection of a position label inserted into said signal after receiving said pause command, and throwing away the received signal following said position label;

sending a request to the transmitter to resume transmission of the signal from the position defined by said position label; and resuming the reproduction of the signal upon receipt thereof.

7. A transmitter for transmitting a compressed television signal, comprising: means for inserting position labels into said signal at positions where the transmission of said television signal can be interrupted and resumed, wherein reproduction of said signal is interrupted upon detection of a position label after a pause command is received.

8. The transmitter as claimed in claim 7, in which the signal comprises a series of sequential data packets, wherein the transmitter is adapted to accommodate said position labels in intermediate control packets.

9. The transmitter as claimed in claim 8, wherein the position labels are transmitted as descriptors in MPEG transport packets.

10. The transmitter as claimed in claim 7, in which the signal comprises a series of sequential data packets, wherein the transmitter is adapted to accommodate said position labels in selected ones of said signal packets.

11. The transmitter as claimed in claim 10, in which the position labels are transmitted as private data bytes in the adaptation field of MPEG transport packets.

12. A receiver for receiving a compressed television signal, wherein the receiver comprises control means adapted to:

receive a pause command;

send a request to a transmitter to interrupt transmission of the signal;

interrupt reproduction of the signal upon detection of a position label inserted into the signal after said pause command is received, and throw away the received signal following said position label;

send a request to the transmitter to resume transmission of the signal from the position defined by said position label; and resume the reproduction of the signal upon receipt thereof.

13. A compressed television signal, including position labels inserted at positions where the transmission of said signal can be resumed after an interruption, wherein reproduction of said signal is interrupted upon detection of a position label after a pause command is received.

* * * * *